United States Patent
Krog

(10) Patent No.: US 8,306,789 B2
(45) Date of Patent: Nov. 6, 2012

(54) METHOD OF DESIGNING A COMPOSITE LAMINATE

(75) Inventor: Lars Krog, Bristol (GB)

(73) Assignee: Airbus Operations Limited, Bristol (GB)

( * ) Notice: Subject to any disclaimer, the term of this patent is extended or adjusted under 35 U.S.C. 154(b) by 394 days.

(21) Appl. No.: 12/591,243

(22) Filed: Nov. 13, 2009

(65) Prior Publication Data

US 2010/0121625 A1     May 13, 2010

(30) Foreign Application Priority Data

Nov. 13, 2008 (GB) .................................. 0820800.1

(51) Int. Cl.
    *G06F 17/50* (2006.01)
(52) U.S. Cl. .................................. 703/1; 703/2; 700/98
(58) Field of Classification Search ...................... 703/1
See application file for complete search history.

(56) References Cited

U.S. PATENT DOCUMENTS

| | | | |
|---|---|---|---|
| 5,984,511 A | 11/1999 | Vasey-Glandon et al. | 703/6 |
| 6,799,081 B1 * | 9/2004 | Hale et al. | 700/98 |
| 7,010,472 B1 | 3/2006 | Vasey-Glandon et al. | 703/6 |
| 7,243,055 B2 * | 7/2007 | Chen et al. | 703/2 |
| 7,668,701 B2 * | 2/2010 | Meizoso Latova et al. | 703/1 |
| 2005/0163975 A1 | 7/2005 | Chen et al. | 428/192 |
| 2006/0029807 A1 | 2/2006 | Peck | 428/411.1 |
| 2007/0244590 A1 * | 10/2007 | Menayo et al. | 700/98 |
| 2008/0103740 A1 | 5/2008 | Meizoso Latova et al. | 703/7 |

FOREIGN PATENT DOCUMENTS

| | | |
|---|---|---|
| EP | 1 003 113 | 5/2000 |
| EP | 1 050 396 | 11/2000 |
| EP | 1 840 775 | 10/2007 |

OTHER PUBLICATIONS

Krog et al, "Application of Topology, Sizing and Shape Optimization Methods to Optimal Design of Aircraft Components", Altair Engineering Ltd, 2002.*
Henrica et al, "Local Optimization of Long Anisotropic Laminated Fibre Composite Panels with T shape Stiffeners", 47th AIAA/ASME/ASCE/AHS/ASC Structures, Structural Dynamics, and Materials Conference, May 1-4, 2006.*
UK Search Report for GB0820800.1, dated Feb. 24, 2009.
J. Stegmann et al, "Discrete Material Optimization of General Composite Shell Structures" *International Journal for Numerical Methods in Engineering*, 2005, vol. 62, pp. 2009-2027.

(Continued)

*Primary Examiner* — Mary C Jacob
(74) *Attorney, Agent, or Firm* — Nixon & Vanderhye P.C.

(57) ABSTRACT

A method of designing a composite laminate including a plurality of zones, each zone including a plurality of plies of composite material, each ply having a respective ply orientation angle. A global stacking sequence of stacking sequence elements is determined for the laminate. A local laminate thickness is determined for each zone. A local stacking sequence is then determined for each zone by extracting a subsequence of stacking sequence elements from the global stacking sequence. The global stacking sequence and the laminate thicknesses are determined together in an optimization process in which multiple sub-ply selection variables are assigned to each stacking sequence element. Optimal values are determined for the sub-ply selection variables and the laminate thicknesses. A single one of the sub-ply selection variables is assigned to each stacking sequence element thereby forcing a discrete choice of global ply orientation angle for each stacking sequence element.

15 Claims, 3 Drawing Sheets

OTHER PUBLICATIONS

E. Lund et al, "Buckling Optimization of Laminated Hybrid Composite Shell Structures Using Discrete Material Optimization" 6th World Congress on Structural and Multidisciplinary optimization, May 2005, pp. 1-10.

L. Krog et al, "COMBOX: A Distributed Computing Process for Optimum Pre-Sizing of Composite Aircraft Box Structures" $10^{th}$ Samtech Users Conference, Mar. 2007.

* cited by examiner

METHOD OF DESIGNING A COMPOSITE LAMINATE

This application claims priority to GB 0820800.1 filed 13 Nov. 2008, the entire contents of which is hereby incorporated by reference.

FIELD OF THE INVENTION

The present invention relates to a method of designing a composite laminate, the laminate comprising a plurality of zones, each zone comprising a plurality of plies of composite material, each ply in each zone having a respective ply orientation angle.

BACKGROUND OF THE INVENTION

Continuous approaches to optimisation of composite laminates allow optimisation of a laminate's in-plane stiffness by optimising the laminate thickness, the percentages of plies oriented along different directions, and the directions of these plies. However, conventional methods do not optimise the laminate's stacking sequence (that is, the sequence of ply orientation angles through the stack) and simplistic assumptions are made about the laminates bending stiffness. This may, when converting the continuous design description into a discrete laminate stacking sequence, lead to significant changes in bending stiffness driven behaviours like buckling. Also additional weight could be added when rounding continuous laminate thickness and ply percentage data into a discrete ply solution, where to be conservative and to achieve a symmetric laminate, it may be required to increase the thickness associated with each discrete ply orientation to a value corresponding to an integer and even ply count. A symmetric laminate is a laminate with a stacking sequence that is symmetrical about its centre. For instance 0°, +45°, 90°, 90°, +45°, 0° is a symmetrical stacking sequence with an even ply count of six.

Composite laminate optimisation methods that allow the use of discrete stacking sequence information in the optimisation may be obtained using predefined stacking sequence tables. A stacking sequence table is used to define the laminate stacking sequence at discrete thickness values. Continuous sizing optimisation can then be performed using interpolation of properties between values found at discrete thicknesses and simple schemes can be devised to force sizing optimisation results to thickness values corresponding to integer ply counts. Stacking sequence tables used with such formulations are normally constructed such that through-thickness stacking sequence rules are satisfied and ply continuity rules are satisfied between discrete thickness values. Optimisation methods as such provide a sizing capability that uses stacking sequence data in the structural analysis and overcomes the previously described round-off problems. However, such methods do not permit optimisation of the laminate's stacking sequence, which is predefined by the stacking sequence table.

Continuous approaches to stacking sequence optimisation may be achieved by formulating the discrete stacking sequence optimisation problem in a continuous form, subdividing each ply into a number of sub-plies and optimising the thickness of sub-plies with a constraint on the total ply thickness. Such methods allow a gradual exchange of one sub-ply, having a specific orientation, for other sub-plies having different orientations. Such an approach is described, for example, in Stegmann J, Lund E (2005): "Discrete material optimization of general composite shell structures". *International Journal for Numerical Methods in Engineering*, 62(14), pp. 2009-2027. A first disadvantage with this approach is that it formulates an optimisation problem with far too many design variables. A second disadvantage is that it does not achieve ply continuity between adjacent zones. That is, the fibre direction in each zone can take any value so adjacent zones may have fibre directions which vary by up to 90°.

SUMMARY OF THE INVENTION

A first aspect of the invention provides a method of designing a composite laminate, the laminate comprising a plurality of zones, each zone comprising a plurality of plies of composite material, each ply in each zone having a respective ply orientation angle, the method comprising:

a. determining a global stacking sequence for the laminate, the global stacking sequence comprising a sequence of stacking sequence elements each defining a respective global ply orientation angle, the percentages of the various ply orientations within the global stacking sequence defining a laminate constitution;

b. determining a local laminate thickness for each zone; and c. determining a local stacking sequence for each zone by extracting a subsequence of stacking sequence elements from the global stacking sequence, wherein the global stacking sequence, the laminate constitution and the local laminate thicknesses are determined together in an optimisation process in which multiple sub-ply selection variables are assigned to each stacking sequence element, each sub-ply selection variable representing the density or sub-ply thickness for a respective candidate ply orientation angle; optimal values are determined for the sub-ply selection variables and the local laminate thicknesses; and a single one of the sub-ply selection variables is assigned to each stacking sequence element thereby forcing a discrete choice of global ply orientation angle for each stacking sequence element.

Preferably the method further comprises determining multiple local ply orientation design variables for each zone, each local ply orientation design variable representing a local ply orientation correction for a respective global ply orientation as used in the global stacking sequence; and wherein the local ply orientation design variables, the global stacking sequence, the laminate constitution and the local laminate thicknesses are determined together in the optimisation process.

Preferably the optimisation process is a gradient-based optimisation process which performs repeated structural analysis, sensitivity analysis and mathematical optimisation steps and seeks to identify a set of sub-ply selection variables and local laminate thicknesses which optimise an objective function whilst satisfying one or more constraint requirements. Each analysis step calculates current values for the objective functions and one or more constraint functions based on a current set of sub-ply selection variables and local laminate thicknesses, each sensitivity analysis step determines partial derivatives of the output of the structural analysis, and each mathematical optimisation step solves an approximate optimisation problem to determine improved values for the sub-ply selection variables and local laminate thicknesses which optimise the objective function whilst ensuring that each constraint function complies with an associated constraint requirement.

By way of example, the structural analysis may involve a calculation of buckling and strength measures, and the constraint requirements could require these strength and buckling measures to be above certain limits. This would ensure design of a laminate having sufficient buckling capability and sufficient strength.

The objective function could in typical aerospace applications be the weight of the laminate.

The objective function may contain a penalty term which serves to push the optimisation process towards selecting a single one of the sub-ply selection variables for each stacking sequence element.

Typically the structural analysis performed in each cycle of the gradient-based optimisation process comprises a two-level analysis process with separate analyses: namely an internal loads analysis for calculating the internal loads in the laminate, and a buckling/strength analysis for calculating buckling and strength measures. In this case the sensitivity analysis comprises a first sensitivity analysis which determines partial derivatives of the output of the first structural analysis and a second sensitivity analysis which determines partial derivatives of the output of the second structural analysis. The first and second sensitivity analyses may now be performed in separate and parallel computing streams before results of the two sensitivity analyses are combined using mathematical chain rule differentiation.

Advantageously the structural analysis could be based on a set of intermediate variables which are derived from the sub-ply selection variables and/or the local laminate thicknesses. Suitable intermediate variables may be the laminate constitution and/or laminate stiffness properties characterising the laminate's bending stiffness.

To enable continuous optimisation of laminate thickness, interpolation of stiffness properties corresponding to integer numbers of stacking sequence elements can be used.

The composite material may, in general, be any anisotropic material. Typically however the composite material comprises a fibre-reinforced material, in which case the ply orientation angle is defined by the fibre direction. The composite laminate may have curved fibres in at least some of the zones.

A second aspect of the invention provides a method of manufacturing a composite laminate, the method comprising designing the composite laminate by the method of the first aspect; and manufacturing the composite laminate in accordance with the design.

BRIEF DESCRIPTION OF THE DRAWINGS

Embodiments of the invention will now be described with reference to the accompanying drawings, in which.

DETAILED DESCRIPTION OF EMBODIMENT(S)

We describe below a method of designing a composite laminate. The method uses an optimisation design description that allows simultaneous design of a laminate's thickness, constitution, ply orientations and stacking sequence in a single continuous process of optimisation. The optimisation design description introduces a number of global and local design variables in order to achieve a laminate description that utilises the laminate's design freedom whilst ensuring ply continuity across the structure, keeping the optimisation problem size and computational efforts at a manageable size. It is noted that the term "laminate constitution" is used herein to describe the percentages of the various ply orientations. For instance a laminate may be said to have a constitution of 30% 0° plies, 30%+/−45° plies, and 30% 90° plies. When designing a laminate both the laminate's in-plane properties (for instance in-plane stiffness) and out-of-plane properties (for instance bending and torsion stiffness) must be optimised. In-plane properties are optimised by controlling the amount of plies in a stack having fibres along specific directions (that is, the laminate constitution) and by adjusting ply orientations. Out-of-plane properties are optimised by controlling the amount of plies in a stack having fibres along specific directions, by adjusting ply orientations and finally by adjusting the order in which plies are stacked (the stacking sequence). Optimising a laminate's directional properties and stacking sequence allows the strength and buckling performance of the laminate to be increased and allows a reduction of laminate thickness (and hence weight).

Figure 1:
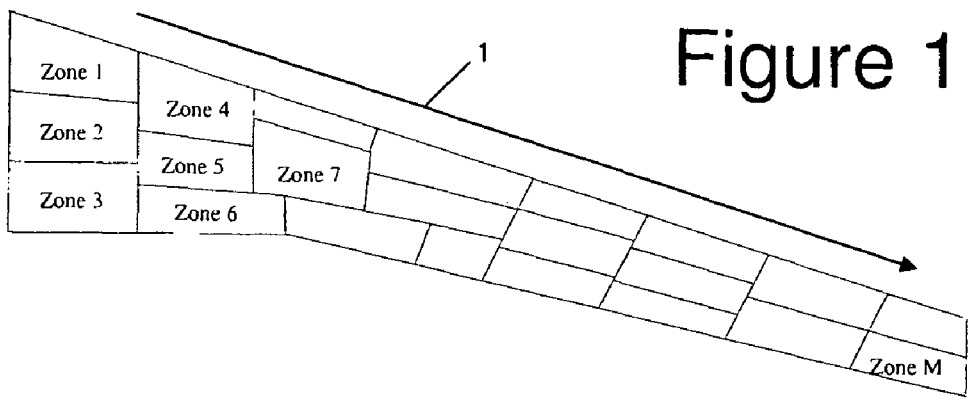
FIG. 1 is a plan view of a composite panel, which has been split into independent design zones that will ultimately have a discrete local laminate thickness and local stacking sequence.

FIG. 1 shows a plan view of a composite panel—in this example an upper or lower skin of an aircraft wing. The panel is notionally divided into a plurality of zones (m=1, 2, . . . , M), each zone having a constant local laminate thickness, local laminate constitution, local ply orientations and local stacking sequence. Each zone comprises a plurality of plies of composite material; the number of plies determining the local laminate thickness. Each ply comprises a plurality of fibres oriented along the same direction and impregnated with a matrix material (typically epoxy resin). The direction of the fibres within a ply defines the orientation angle of the ply. This orientation angle is defined with respect to a global reference axis. In FIG. 1 this reference axis is defined as line 1, and thus plies having fibres running parallel with line 1 are defined as 0° plies, whilst plies having fibres running orthogonal to line 1 are defined as 90° plies.

Figure 2:
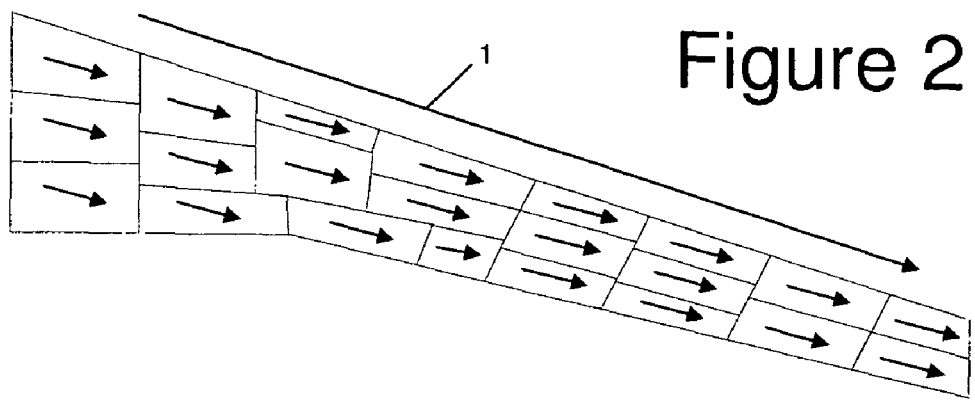
FIG. 2 shows a global ply definition having straight fibres across the laminate, with all fibres running along a 0 degree global ply orientation.
Figure 3A:
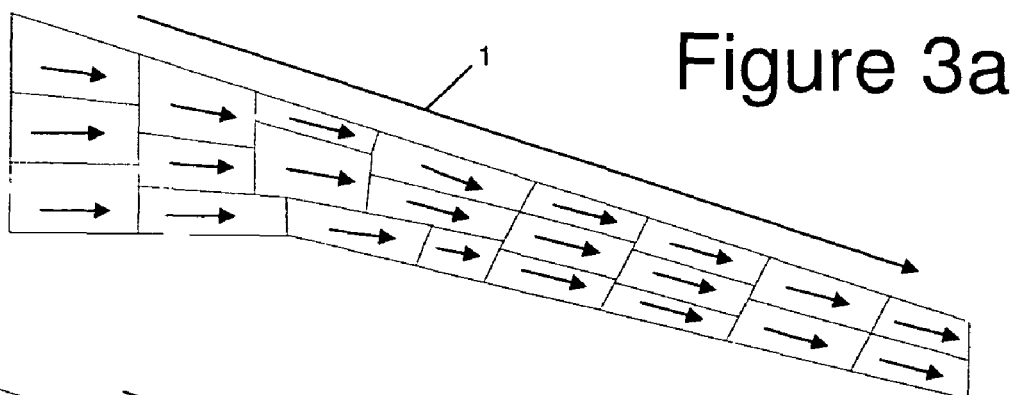
FIG. 3a shows a ply definition in which the 0 degree global ply orientation is adjusted locally for some of the zones.

FIG. 2 shows a ply with straight fibres, all running along a 0 degree ply orientation, whilst FIG. 3a shows a ply having fibres which do not all run in exactly the same direction. To allow this variation in fibre direction between the zones, we define a local ply orientation associated with a global ply orientation "n" and local zone "m" as $\theta_{mn}=\theta_{0n}+\Delta\theta_{mn}$. In this notation $\theta_{0n}$ represent the global ply fibre orientation and $\Delta\theta_{mn}$ an adjustment to this orientation made locally for zone m.

Figure 3B:
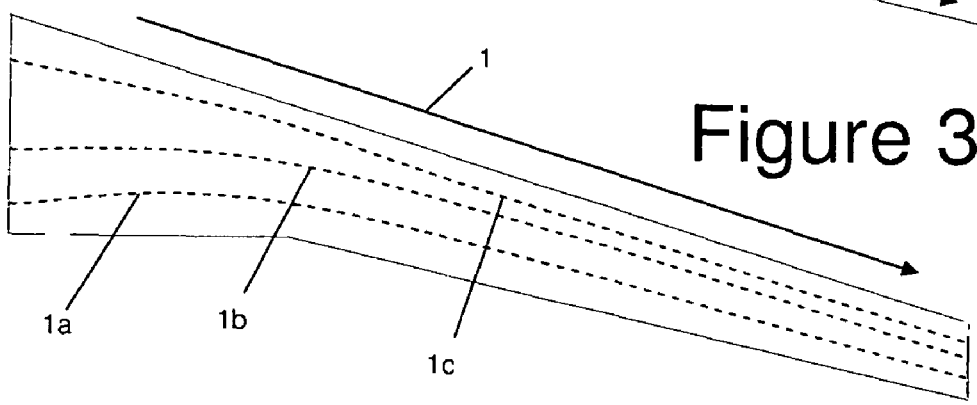
FIG. 3b shows a single ply of a wing skin manufactured from the ply definition of FIG. 3a and incorporating curved fibres.

Note that the ply description shown in FIG. 3a assumes that fibres in each zone are straight and that the fibre direction changes abruptly between zones. However, in a post-processing step the ply description of FIG. 3a is converted, for instance by interpolation, into a curved fibre description. FIG. 3b shows an example of a curved fibre description showing three curved fibres 1a, 1b, 1c derived from the ply description of FIG. 3a. Such curved fibres can be achieved in the final manufactured product by known advanced fibre placement techniques.

Finally, a laminate is constructed by stacking plies having fibres running along different directions. The stacking order of plies having different orientations defines the laminate stacking sequence, and the relative amount of plies in the stacking having each orientation defines its constitution. The laminate stacking sequence is described by its sequence of global ply orientations $\theta_{0n}$. For a standard laminate the global ply orientations $\theta_{0n}$ are typically taken from a fixed set of ply orientations such as 0°, +45°, −45°, and 90°.

Figure 4:
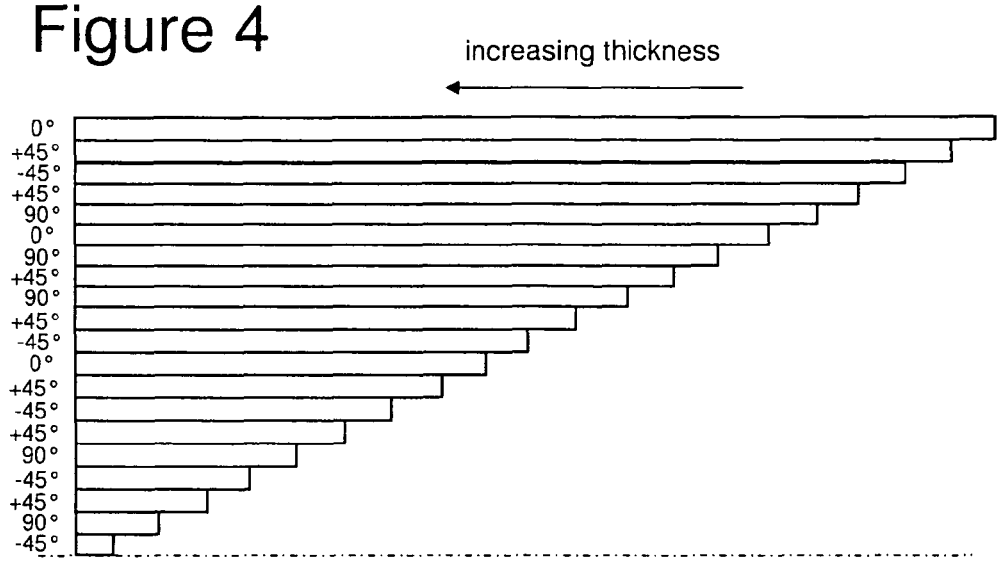
FIG. 4 shows a stacking sequence table.

FIG. 4 shows a stacking sequence table describing a laminate's constitution and stacking sequence at discrete thickness values corresponding to integer ply counts. The stacking sequence table, in this case, assumes a symmetric laminate and thus only the stacking sequence for half of the laminate thickness is shown. Each horizontal bar in the stacking sequence table shown in FIG. 4 represents a single ply in the stacking sequence. The global stacking sequence is an ordered list of twenty elements, the outermost ply in the sequence being represented by bar 2 and the innermost ply in the sequence being represented by bar 3. Each horizontal bar of the stacking sequence is assigned with a single ply orientation angle. FIG. 4 shows such ply orientation angles down its left hand side. The stacking sequence table is a global laminate description and thus applies to the full panel. With reference to FIG. 1, if "zone m" needs a laminate with a thickness corresponding to 16 plies, a subsequence of eight stacking sequence elements)(0°/+45°/−45°/+45°/90°/0°/90°/+45° is extracted from the stacking sequence table of FIG. 4 and converted to a symmetric stacking sequence) (0°/+45°/−45°/+45°/90°/0°/90°/+45°/+45°/90°/0°/90°/+45°/−45°/+45°/0° for the 16 plies. Note that the global stacking sequence is given by the sequence of global ply orientations $\theta_{0n}$, and that local ply orientation adjustments $\Delta\theta_{mn}$ may be applied independently for each design zone "m" and for each global ply orientation "n". Note also that the subsequence of stacking sequence elements is a contiguous set of stacking sequence elements in the global stacking sequence. In other words if the global stacking sequence is an ordered set of twenty elements numbered from 1-20, then the subsequence of eight element is a contiguous set such as 1,2,3,4,5 6,7,8, rather than a non-contiguous set such as 1,4,7,10,16, 17,19,20.

Figure 5:
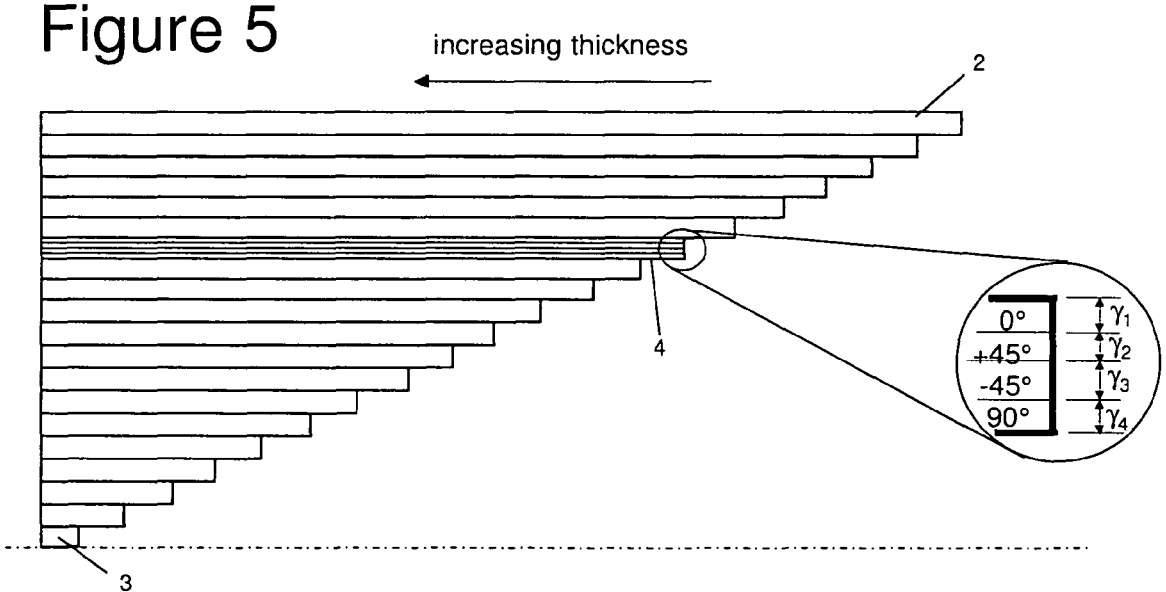
FIG. 5 shows a stacking sequence table in which the ply-orientation for a single ply has been parameterized by defining continuous sub-ply selection variables.

To allow the stacking sequence table itself to be optimised as part of a continuous global optimisation process, stacking sequence design variables are introduced. Instead of assigning a single global ply orientation angle $\theta_{0n}$ to each ply, all candidate ply orientations are assigned as sub-plies to each ply in the stacking sequence table and associated with continuous sub-ply selection variables $\gamma_{0n}$. FIG. 5 illustrates the introduction of such sub-ply selection variables $\gamma_{0n}$ to achieve a continuous design description that allows a gradual exchange of sub-plies with different global ply orientation angles by adjusting the set of sub-ply selection variables associated with the ply. Selection of a single ply orientation for the ply is achieved by pushing the sub-ply selection variable associated with the desired global ply orientation to its upper limit. In this case no other sub-plies will be present and a discrete choice of ply orientation description for the ply has been made. Design variables $\gamma_{0n}$ can be interpreted either as sub-ply densities or sub-ply thicknesses corresponding to a global ply orientation $\theta_{0n}$. It is noted that only sub-ply selection variables for a single ply 4 are shown in FIG. 4.

This method of describing a laminate's stacking sequence provides a continuous design description enabling simultaneous optimisation of a laminate's constitution, ply orientations and stacking sequence. Central to the design description is the combination of a stacking sequence table, describing a laminate for an entire composite panel, with a continuous design description for stacking sequence optimisation. This combination provides a design description that allows stacking sequence optimisation by use of continuous methods of optimisation and the use of a stacking sequence table serves to reduce optimisation problem size and provides a way of ensuring ply continuity across a laminate with a variable thickness and constitution. The parameterisation of ply orientation angles via both global ply-orientation variables and local ply-orientation corrections allows laminates to be designed having either straight or curved fibres. The description so far has not considered how to achieve an optimisation of the laminate's thickness in combination with optimisation of the laminate's stacking sequence table. This is considered next.

To also allow laminate thickness optimisation, continuous local laminate thickness design variables $t_m$ are added corresponding to each zone of the composite panel, and these local laminate thickness design variables are linked to the laminate description provided by the global stacking sequence table. Specifically, to obtain a continuous optimisation formulation we must be able to express laminate properties, such as elastic properties and laminate constitution information as continuous functions of all both global and local design variables. The stacking sequence table description allows laminate property data to be calculated only at discrete thickness values corresponding to integer ply counts. For example, by using classical laminate theory laminate, stiffness properties at discrete ply counts K may be calculated as $$A_{ij}^m = \sum_{k=1}^{K} (h_k - h_{k-1}) \left( \sum_{n=1}^{N} \gamma_{0n}^k \overline{Q}_{ij}(\theta_{0n} + \Delta\theta_{mn}) \right) \quad \text{Eq(1)}$$

$$B_{ij}^m = \frac{1}{2} \sum_{k=1}^{K} (h_k^2 - h_{k-1}^2) \left( \sum_{n=1}^{N} \gamma_{0n}^k \overline{Q}_{ij}(\theta_{0n} + \Delta\theta_{mn}) \right)$$

$$D_{ij}^m = \frac{1}{3} \sum_{k=1}^{K} (h_k^3 - h_{k-1}^3) \left( \sum_{n=1}^{N} \gamma_{0n}^k \overline{Q}_{ij}(\theta_{0n} + \Delta\theta_{mn}) \right)$$

The inner summation in equation (1) provides a calculation of effective ply properties via a summation of elastic properties for individual sub-plies according to the value of the sub-ply selection variables $\gamma_{0n}^k$ and with $\overline{Q}_{ij}(\theta_{0n}+\Delta\theta_{mn})$ providing the membrane stiffness properties for a sub-ply rotated by a ply orientation angle $\theta_{0n}+\Delta\theta_{mn}$. The calculation implements a simple rule of mixtures with sub-ply selection variables interpreted as ply densities. The outer summation in equation (1) provides the calculation of laminate stiffness properties for a laminate with K plies according to classical laminate theory, with $h_k$ representing through thickness coordinates for individual plies. Calculation of laminate stiffness properties according to classical laminate theory is considered a known subject and is not explained in further detail, except for pointing out that the equations for calculation of $A_{ij}$, $B_{ij}$, $D_{ij}$ provide the laminate's membrane, membrane-bending coupling and bending stiffness properties respectively.

For certain strength calculations, rather than providing the laminate's elastic properties it may be necessary to provide the laminate's ply-percentages and ply-orientations.

For such calculations, equation (2) below provides an equation for calculation of the volume fraction of plies with orientation $\theta_{0n}+\Delta\theta_{mn}$. The calculation simply sums the thickness of all sub-plies in the stack with orientation $\theta_{0n}+\Delta\theta_{mn}$, according to the values of their sub-ply selection variables, and then divides by the sum of all ply thicknesses.

$$p_n = \sum_{k=1}^{K} \gamma_{0n}^k (h_k - h_{k-1}) \bigg/ \sum_{k=1}^{K} (h_k - h_{k-1}) \qquad \text{Eq(2)}$$

Figure 6:
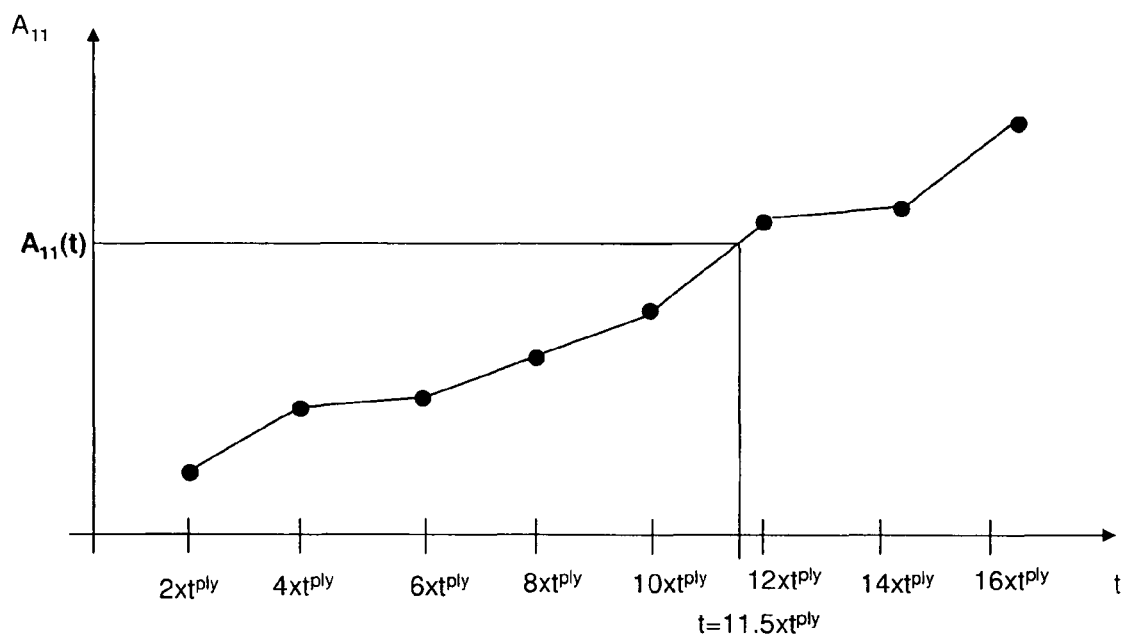
FIG. 6 shows how the interpolation of elastic properties may be used to calculate elastic properties as a continuous function of thickness.

Laminate properties calculated by the above equations are expressed as continuous functions of sub-ply selection variables and global/local ply orientation variables, but are only available at discrete thickness values corresponding to integer ply counts K. Achieving a fully continuous optimisation design description requires being able to calculate laminate properties as continuous functions of all design variables, including the laminate thickness. This may be obtained by introducing simple interpolation schemes. FIG. 6 shows how a stiffness property $A_{11}(t)$ could be calculated at continuous thickness values t by interpolating stiffness values found at discrete thickness values $2 \times t^{ply}$, $4 \times t^{ply}$ etc., and the computer pseudo code below provides a process for calculation of laminate stiffness properties at continuous thickness values.

```
loop k = 1 to k = k_max
    if(t_m ≥ k * T_Ply and t_m < (k + 1) * T_Ply) then
        α = 1 - (t_m - k * T_ply) / T_Ply
        A_1111 =
            α * A_1111(k, γ_0, θ_0, Δθ_m) + (1 - α) * A_1111(k + 1, γ_0, θ_0, Δθ_m)
        ⋮
        B_1111 =
            α * B_1111(k, γ_0, θ_0, Δθ_m) + (1 - α) * B_1111(k + 1, γ_0, θ_0, Δθ_m)
        ⋮
        D_1111 =
            α * D_1111(k, γ_0, θ_0, Δθ_m) + (1 - α) * D_1111(k + 1, γ_0, θ_0, Δθ_m)
        ⋮
    endif
end loop
```

Interpolation schemes, such as described above, allow laminate properties to be obtained as continuous functions of the local laminate thickness, global sub-ply selection variables, global ply orientation design variables and local ply orientation correction design variables and must be used whenever laminate properties are required for structural analysis purposes such as in local strength and buckling analyses. Interpolation schemes must be used whenever an optimisation sensitivity analysis requires calculation of laminate property design sensitivities. The above only describes a very simple piecewise linear interpolation scheme. Interpolation schemes providing a smoother response may be devised if required for enhanced optimisation convergence.

Continuous laminate thickness design variables have now been added to the design description and linked with the continuous laminate design description thus providing a fully continuous optimisation design description for simultaneous optimisation of a laminate's thickness, constitution, ply orientations and stacking sequence. The developed optimisation design description introduces both global and local design variables and allows laminate optimisation problems to be solved with varying degrees of design freedom. For example one could choose to optimise laminate thickness and stacking sequence but take ply orientations to be fixed, or one could choose to optimise laminate thickness, stacking sequence and global orientations. In the latter formulation straight fibres would be maintained within each ply. Also one could imagine linking global ply orientation variables to design a laminate with a 0°, ±β°, 90° laminate system. Finally, one could imagine solving laminate design problems for other composite structures than just a "flat" composite panel, as illustrated in FIG. 1. In such applications the design description provided here would need to be combined with other design variables. For example to determine a minimum weight design for a stiffened composite panel, one would need to introduce additional design variables to control the cross sectional dimensions of stiffeners. The laminate design description provided here could possibly be used independently for skins and stringers, with skins and stringers having independent and separate laminate descriptions.

A continuous design description has now been defined to allow a laminated composite structure to be designed by means of continuous gradient-based methods of optimisation. The remainder of this description concentrates on how the developed laminate design description can be used within a mathematical gradient-based optimisation search process. Part of the description in the following is generic, describing how to formulate and solve optimisation problems using gradient-based mathematical optimisation, while other parts of the description are specific to this invention, describing how to achieve an efficient structural analysis and optimisation process when using the continuous laminate design description.

In a mathematical sense, designing an optimum laminate simply requires finding optimum values for the set of design variables describing the design. In the mathematical treatment of the design problem the interpretation of design variables as physical parameters is irrelevant with the optimum design being seen simply as a set of design variables that minimises or maximises an objective function (such as weight) whilst satisfying a set of constraint equations. The optimisation solution process followed when solving optimisation problems by a gradient-based optimisation search process is a systematic process, which allows the solution of complex design problems having 1,000's of design variables and 100,000's of constraints.

The following defines a generic mathematical model for formulation of laminate optimisation problems. We start by defining a vector of continuous design variables $a=\{a_1, a_2, \ldots, a_i, \ldots a_I\}$. With reference to the laminate design description described above, a design variable $a_i$ may represent a local thickness $t_m$, a global ply orientation $\theta_{0n}$, a local ply-orientation correction $\Delta\theta_{nm}$ or a global sub-ply selection variable $\gamma_{0n}^k$ but could also represent other design variables like stiffener cross section dimensions for a stiffened panel.

As an example of optimisation problem size for a typical aerospace application the following provides an estimate of the number of design variables required for optimisation of a stiffened wing skin for a large passenger aircraft. Consider that the stiffened wing skin is broken into 500 skin panels by the rib and stringer arrangement while stringers are broken into 500 corresponding stringer segments. To fully optimise the strength and buckling performance of the stiffened wing skin, each of the 500 skin panels and each of the 500 stringer segments should be optimised. For optimisation purposes the skin is described using the laminate design description described above. The wing skin laminate is composed of plies having four different global ply-orientations, and local ply-orientation correction variables are introduced to allow the use of curved fibres. A ply thickness of 0.25 mm and a maximum skin thickness of 30 mm is assumed. This requires the design of a 120 element stacking sequence table with three sub-ply selection variables associated with each layer for selection between four global ply-orientations. Note that one variable per layer has been eliminated due to a constraint that the sum of sub-ply selection variables must equal 1.0. The stringer design description is for optimisation purposes kept simple allowing only optimisation of stringer cross-section dimensions. A blade cross-section described by four design variables is assumed. Using these assumptions, formulating an optimisation problem for sizing/laminate optimisation of the stiffened wing skin panel would require a) 500 local skin laminate thickness design variables;

b) 4 global skin laminate ply orientation design variables;

c) 4×500 local skin laminate ply orientation correction design variables;

d) 120×3 sub-ply selection variables for stacking sequence optimisation; and e) 4×500 local stiffener cross-section design variables.

In total the design description for design of the stiffened panel requires 4864 design variables to describe the composite laminate for the wing skin and to describe stiffener cross section dimensions. Reducing the number of design variables is possible by linking design variables across larger zones. Linking skin thickness and stringer cross section dimensions over design zones covering 2×2 skin panels and 2×2 stringer segments reduces the number of local section design variables and ply-orientation variables by a factor of four, and reduces the required number of design variables to 1459. It would now be possible to optimise a top and bottom wing cover in a single optimisation with ~3000 design variables. A further reduction of the number of design variables may be achieved by forcing the use of symmetric laminates on both top and bottom covers. In this case only half the number of design variables would be required to describe stacking sequences for the top and bottom wing skin laminates, eliminating a further 360 design variables. Clearly optimization problem sizes using the developed laminate design description will be large, but problem sizes are within limits where solving optimization problems by mathematical optimization using currently available optimization software is possible.

Next we define the optimisation problem formulation. For the present description we consider a generic structural optimisation problem formulation, where for generality all constraints have been expressed as a function of both design variables a and internal structural loads $R^{int}(a)$. Including this dependency on internal structural loads, which are themselves a function of design variables, via global structural equilibrium equations, allows strength and buckling issues to be solved by both strengthening the structure and by redirecting internal structural loads.

$$\begin{array}{ll} \underset{a_i}{\text{Minimise}} & f(a) \qquad i = 1, \ldots, I \\ \text{Subject to:} & g_j(a, R^{int}(a)) \geq G_j \quad j = 1, \ldots, J \\ & h_k(a, R^{int}(a)) = H_k \quad k = 1, \ldots, K \\ & \underline{a}_i < a_i < \overline{a}_i \qquad i = 1, \ldots, I \end{array} \qquad \text{Eq (3)}$$

In typical aerospace applications the objective function $f(a)$ could be weight, whilst inequality constraints $g_j(a, R^{int}(a)) > G_j$ could be used to express strength and buckling requirements. Within the above formulation it would also be possible to formulate constraints to restrict the type of laminate being designed. For example equality constraints could be used to force entries in the laminates membrane-bending coupling stiffness tensor $B_{ij}$ to equal zero, avoiding laminates with membrane-bending torsion coupling causing cure distortions in manufacturing, and inequality constraints could be used to limit the jump in ply strain energy density as a means to avoid laminates with neighboring plies having large ply orientation differences. Finally constraints could be formulated to impose restrictions on local thickness changes and/or to impose restrictions ensuring smooth thickness and ply orientation evolutions.

The specific optimization problem formulation is not considered part of this invention. Rather the optimization problem formulation in Eq (3) is seen as a generic optimization formulation.

Specific to the laminate optimisation problems considered here, we will have to introduce a small change to the optimisation formulation in Eq (3). A mechanism is required to ensure that the stacking sequence table in the final iteration has well defined ply properties. That is we must ensure that only one of the sub-ply selection variables γ associated with each ply in the stacking sequence table will have a non-zero value. One mechanism to achieve this is to add a penalty term to the objective function $f(a)$. The penalty term should penalise any ply mixture, i.e. designs with intermediate γ values. The form of such an expression could for example be:

$$P(c, \gamma) = c \sum_{k=1}^{K} (1 - \gamma_1^k) \cdot (1 - \gamma_2^k) \cdot \ldots \cdot (1 - \gamma_{nPlyOri}^{ki}) \qquad \text{Eq(4)}$$

In the above expression K is the number of plies in the stacking sequence table while nPlyOri is the number of global ply orientations. This expression will have a positive value except in the special case where one of the variables γ for each ply takes on the value 1. Adding this term to the objective function will push the optimisation process towards selecting a single ply orientation for each ply. To ensure that this term does not become overly dominating in initial iteration it will be necessary to start the optimisation with a small value of c and then progressively increase the value throughout the iterative optimisation process.

In a general gradient-based optimisation solution procedure the optimisation problem in Eq (3) is solved by forming and solving a number of approximate optimization sub-problems. Different approximation schemes such as sequential linear programming, sequential convex programming or sequential quadratic programming may be used. As an example in a sequential linear programming approach we would form and solve a series of linear optimization sub-problems of the form given in below Eq (5).

$$\underset{\Delta a_i}{\text{Minimise}} \quad f(a^{iter}) + \nabla f(a^{iter})\Delta a^{iter} \qquad i = 1, \dots, I \qquad \text{Eq (5)}$$

$$\text{Subject to:} \quad g_j(a^{iter}) + \nabla g_j(a^{iter})\Delta a^{iter} \geq G_j \quad j = 1, \dots, J$$

$$h_k(a^{iter}) + \nabla h_k(a^{iter})\Delta a^{iter} = H_k \quad k = 1, \dots, K$$

$$\overline{a_i} < a_i^{iter} + \Delta a_i^{iter} < \overline{a_i} \qquad i = 1, \dots, I$$

The approximate optimisation problem is built replacing the original objective and constraint functions by linear extrapolations in design variable changes. Linear extrapolations, which are used to predict the value of objective and constraint functions after a simultaneous change of multiple design variables, may be written as $$f(a^{iter} + \Delta a^{iter}) \approx f(a^{iter}) + \nabla f(a^{iter})\Delta a^{iter} = \qquad \text{Eq(6)}$$

$$f(a^{iter}) + \sum_{i=1}^{I} \frac{\partial f(a^{iter})}{\partial a_i}\Delta a_i$$

$$g(a^{iter} + \Delta a^{iter}) \approx g(a^{iter}) + \Delta g(a^{iter})\Delta a^{iter} =$$

$$g(a^{iter}) + \sum_{i=1}^{I} \frac{\partial g(\Delta a^{iter})}{\partial a_i}\Delta a_i$$

Building objective and constraint function approximations requires calculation of both function values and so-called design sensitivities. So in equation (6) it is for example necessary to calculate both: the objective function value $f(a^{iter})$ and its design sensitivities $\partial f(a^{iter})/\partial a_i$.

In mathematical terms design sensitivities are partial derivatives of function values with respect to design variable changes while in more engineering terms they simply express the rate of change of function values with respect to design variable changes.

Figure 7:
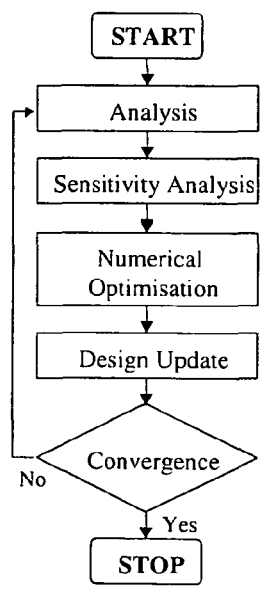
FIG. 7 shows steps followed in an exemplary gradient based mathematical optimisation process.

The optimization problem in Eq (5) may, due to its known mathematical structure, be solved efficiently by specific mathematical programming routines. Thus rather than solving the original optimisation problem in Eq (3) we choose to solve a sequence of approximate problems that has a desirable mathematically structure. This allows solution of large-scale optimisation problems. Solving optimisation problems by mathematical optimisation techniques follows a systematic and iterative calculation process involving a number of well-defined steps and is therefore well suited to automation. Steps required may depend of the specific optimisation procedure, but generally will always include calculations for analysis and sensitivity analysis. FIG. 7 shows basic steps in a mathematical programming driven optimisation process.

The optimisation process illustrated in FIG. 7 is a systematic calculation process. Each iteration of the optimisation process starts with an analysis of the current design, represented by the design variable vector $a^{iter}$, to determine current values of the objective function $f(a^{iter})$, inequality constraint functions $g_j(a^{iter}, R^{int}(a^{iter}))$ and equality constraint functions $h_k(a^{iter}, R^{int}(a^{iter}))$. The analysis is followed by a design sensitivity analysis to determine partial derivatives of both the objective function $\partial f(a^{iter})/\partial a_i$, in-equality constraint functions $\partial g_j(a^{iter})/\partial a_i$ and equality constraint functions $\partial h_k(a^{iter})/\partial a_i$. Next in the numerical optimisation step we determine improved values of design variables by determining a design variable update $\Delta a^{iter}$, solving an approximate optimisation problem of a form such as in Equation (5). We can now update the vector of design variables $a^{iter+1} = a^{iter} + \Delta a^{iter}$. Finally, in the convergence step, the process determines whether the optimisation process has converged. The convergence checks could involve determining if the design has converged, if the objective function has converged and if all constraints have been satisfied.

In a typical aerospace application calculation of the objective function $f(a^{iter})$ could consist in evaluation of a simple function such as laminate weight, whilst the calculation of constraints could involve calculation of laminate buckling and strength criteria $g_j(a^{iter}, R^{int}(a^{iter}))$. The calculation of strength and buckling criteria typically involves firstly a calculation of internal loads in the laminate $R^{int}(a^{iter})$ and next a calculation of strength and buckling properties for the laminate, each structural property being associated with a respective constraint $g_j(a^{iter}, R^{int}(a^{iter}))$.

The above has provided a generic description of how structural optimisation problems can be formulated and solved in an iterative numerical analysis process comprising repeated structural analysis, sensitivity analysis and mathematical optimisation. It has been argued that using such techniques allows us to solve optimisation problems, considering simultaneous optimisation of 1,000's of design variables whilst monitoring 100,000's of constraints. This statement is true in terms mathematical optimisation methods being available to handle such problem sizes, but does not consider the computational efforts required for structural analysis and sensitivity analysis. Computational efforts, for sensitivity analysis of structural criteria, may be very significant and needs specific attention in order to develop a numerically efficient calculation process.

As a final part of this description it is considered how to use the developed laminate design description within a multi-level aerospace stress process and achieve an efficient numerical calculation process for a gradient-based optimization approach.

A typical aerospace structural analysis process involves both finite element analysis for internal loads calculations and a separate local analysis processes for strength and buckling assessments. Local strength and buckling analyses are typically carried out for small partitions of the structure and typically could involve calculation of reserve factors for buckling, damage tolerance and reparability criteria. A typical local analysis element is a super-stringer consisting of a segment of stringer and its joining left and right skin panels. The super-stringer strength and buckling performance is analyzed based on its geometry, laminate properties and its load state described by the longitudinal, transverse and shear loads in the left/right skin panel and longitudinal load in the stringer (in total 7 load inputs). The local analysis could itself contain a chain of independent or dependent local analyses. In terms of analysis times solving the global finite element analysis equilibrium equations to determine internal loads could take in the order of 5 minutes for a coarse finite element model with 20 load cases, while local analyses (assuming a super-stringer analysis) could take in the order of 0.1 second per local analysis and per load case. Thus performing an analysis of a full top and bottom wing cover each comprising 500 panels top and bottom could take in the order of 35-40 minutes. Whilst such analysis times are acceptable for analysis purposes, analysis times are clearly prohibitive for calculation of sensitivities by finite differences. Assuming an analysis time of 40 minutes, performing a full sensitivity analysis for 3000 design variables will take ~2000 hours.

The key to achieving an efficient sensitivity analysis process for strength and buckling constraints is to use mathematical chain rule differentiation. Recalling the optimization problem formulation in Eq, (5) it is necessary to calculate partial derivatives for constraints functions that are functions of both design variables and design dependent internal loads. Using chain rule differentiation the calculation of partial derivatives would be undertaken as:

$$\frac{\partial g(a, R^{int}(a))}{\partial a_i} = \frac{\partial g(a, R^{int}(a))}{\partial a_i}\bigg|_{\substack{Fixed \\ Loads}} + \sum_{j=1}^{NR_{local}} \left( \frac{\partial g(a, R^{int}(a))}{\partial R_j^{int}}\bigg|_{\substack{Fixed \\ Geometry}} \frac{\partial R_j^{int}(a)}{\partial a_i} \right) \quad \text{Eq(7)}$$

The above equation splits the design sensitivity analysis into a calculation of terms that capture changes of constraints with respect to design variable changes and load changes and terms that captures changes in the global load distribution. Arranging the sensitivity analysis in this way allows us to use efficient commercially available finite element analysis codes for the load redistribution part of the sensitivity analysis, while sensitivity analysis for constraint changes can be performed using finite differences approximations, perturbing input to the local strength and buckling checks under assumption of fixed loads and geometry.

Calculation of internal load sensitivities with respect to design variable changes may be performed using commercially available finite element analysis software with capabilities for design sensitivity analysis. For example, MSC/Nastran's solution procedure for design sensitivity analysis and optimisation allows such analysis. The optimisation capability of MSC/Nastran allows both the definition of design variables and the definition of equations for calculation of material, laminate and section properties. Using these capabilities it is possible to define the stiffness and section properties of individual finite elements to be a function of design variables and therefore use relationships such as those provided in Equations (1), (2) in a parametric finite element model. Using the interpolation schemes described above to achieve continuous dependency between laminate properties and thicknesses will be difficult using currently available capabilities, but can be achieved e.g. by rewriting the input deck at each iteration reflecting a linearisation of equations around a current design point. Design sensitivity analysis and optimisation capabilities in MSC/Nastran furthermore allow the definition of constraints, which are functions of both design variables and of finite element analysis results, and the internal calculation procedures for design sensitivity analysis allows an efficient semi-analytical differentiation of constraints. Such approaches have been used to calculate internal loads sensitivities for a full wing loads diffusion finite element model with 20 loads cases and 3000 design variables in about 3 hours.

Calculation of constraint sensitivities with respect to design variable and internal loads changes may possibly be done analytically but is more often achieved via finite difference approximations perturbing input variables to the local strength and buckling analysis. Finite different approximations of constraints sensitivities may be written as $$\frac{\partial g(a, R^{int}(a))}{\partial a_i}\bigg|_{\substack{Fixed \\ Loads}} = \frac{g(a + \Delta a_i, R^{int}(a)) - g(a, R^{int}(a))}{\Delta a_i} \quad \text{Eq(8)}$$

$$\frac{\partial g(a, R^{int}(a))}{\partial R_j^{int}}\bigg|_{\substack{Fixed \\ Geometry}} = \frac{g(a, R^{int}(a) + \Delta R_j^{int}) - g(a, R^{int}(a))}{\Delta R_j^{int}}$$

In the above equation a and $a+\Delta a_i$ represent an un-perturbed vector of design variables and a perturbed vector of design variables in which only design variable "i" has been changed. Similarly $R^{int}$ and $R^{int}+\Delta R^{int}_j$ represent an un-perturbed and perturbed vector of internal loads. It is noted that constraints will only be a function of entries in the global design variable/internal load vectors that directly affect the constraint function and that design sensitivities only need to be calculated for such entries. Design sensitivities for other entries equals zero. This property is used to greatly reduce the amount of computing required when calculating constraint sensitivities.

The developed laminate design description introduces a number of global design variables in order to describe global laminate stacking. Although the use of global design variables to describe a stacking sequence helps reduce design variable counts and helps ensures global ply continuity, it also causes efficiency problems for the design sensitivity analysis. The problem is the number of input variables needed for the local strength or buckling analysis. Using the developed laminate design description, strength and buckling constraint calculations may be represented by, $$g(a,R^{int}(a))=g(t,\gamma,\theta,\Delta\theta,R^{int}(t,\gamma,\theta,\Delta\theta)) \quad \text{Eq (9)}$$

Returning to our global wing stiffened panel design problem with 500 panels on each the top and bottom covers, and assuming that the strength and buckling properties of the skin is analysed as a collection of super-stringers. With the design description formulation assumed in Equation 9 each super-stringer analysis would require the following input: 2 skin thickness design variables, 180 skin ply selection design variables, 4 global skin ply orientations, 2×4 local skin ply orientation corrections, 4 stringer cross section design variables and 7 local loads. A full sensitivity analysis for a super-stringer would therefore require 205 perturbation analyses. Considering 1000 stiffened panels, subjected to 20 load cases and assuming an analysis time of 0.1 second per analysis and per load case a full sensitivity analysis would require ~114 hours.

Already this represents a significant time saving compared to the previously estimated 2000 hours for design sensitivity analysis. Breaking the design sensitivity analysis into sensitivity analysis for internal load redistribution and design sensitivity analysis for constraint changes allows us to perform the sensitivity analysis with ~3 hours for internal loads sensitivities and 114 hours for constraint function sensitivities.

To further reduce the time required for local constraint sensitivity analysis, rather than basing strength and buckling constraint calculations directly on design variable input, calculations could be based on a set of intermediate variables. For example calculations could be based on sizing variables t, laminate percentages p, local ply orientations θ and bending stiffness properties D, with laminate percentages and bending stiffness properties being calculated from primary design variables using Eqs (1)-(2). Using this choice of variables constraints are evaluated as:

$$g(a,R^{int}(a))=RF^{strength/t}(t,p,\theta,D,R^{int}(t,p,\theta,D)) \quad \text{Eq (10)}$$

Organising calculations in this way allows us to replaces the 180 global sub-ply selection variables for the laminate constitution and stacking description with a few ply percentage variables and bending stiffness parameters, and restricts input to the super-stringer analysis to 2 skin thickness values, 2×4 skin ply percentage, 2×4 skin ply orientations, 2×6 skin bending stiffness terms, 4 stringer cross-section variables and 7 local loads. A full sensitivity analysis for a super-stiffener would now require perturbation of 41 input variables and a full sensitivity analysis for a structure with 1000 stiffened panels subjected to 20 load cases could now be performed in ~23 CPU hours. When using this approach care should be taken not to double account for any input variable. For example buckling calculations should be performed only on D matrix input.

As a final note on design sensitivity analysis, it should be mentioned that the use of intermediate design variables in the design sensitivity analysis slightly complicates the chain rule expression in Eq (7). As input to the chain rule expression in Eq (7) we must be able to calculate constraint function sensitivities with respect to primary design variable changes. Such values are now to be obtained via another mathematical chain rule differentiation calculated by the following simple expression:

$$\left.\frac{\partial RF_j(t, p, \alpha, D, R^{int}(a))}{\partial a_i}\right|_{\substack{fixed \\ loads}} = \qquad \text{Eq(11)}$$

$$\sum_{m=1}^{nSizing} \frac{\partial RF_j(t, p, \theta, D, R^{int}(a))}{\partial t_m} \frac{\partial t_m}{\partial a_i} +$$

$$\sum_{m=1}^{nPlyOri} \frac{\partial RF_j(t, p, \theta, D, R^{int}(a))}{\partial p_m} \frac{\partial p_m(t, \gamma)}{\partial a_i} +$$

$$\sum_{m=1}^{nPlyOri} \frac{\partial RF_j(t, p, \theta, D, R^{int}(a))}{\partial \theta_m} \frac{\partial \theta_m}{\partial a_i} +$$

$$\sum_{m=1}^{6} \frac{\partial RF_j(t, p, \theta, D, R^{int}(a))}{\partial D_m} \frac{\partial D_m(t, \gamma, \alpha)}{\partial a_i}$$

This completes the description on how to perform a correct and efficient design sensitivity analysis. Calculation design sensitivities is now a manageable task, requiring in the order 3 hours of computing for internal loads sensitivity calculation and 23 hours for local constraint sensitivity analysis. To further reduce run times it is noted that the design sensitivity analysis lends itself perfectly to distributed/parallel computing. Distributed parallel computing streams can be used both for composite strength/buckling analysis and sensitivity analysis and for internal loads analysis and sensitivity analysis. The internal loads sensitivity analysis could be further broken down into sensitivity analysis per load case. Assigning 3 processors for internal load sensitivity analysis and 23 processors for buckling/strength constraints sensitivity analysis would allow us to perform this task in ~1 hour, giving a total cycle time of 3-4 hours if assuming an 1-2 hours for solution of the optimisation problem and 1 hour for other analysis and chain ruling differentiation tasks.

In summary, the preferred embodiment of the invention described above provides a global and continuous design description allowing optimisation of the laminate's stacking sequence: that is, the sequence of angles defined by the various plies in each zone, whilst ensuring ply continuity across neighbouring zones. For design of a minimum weight composite laminate the method provides mixed formulations for simultaneous optimisation of the laminates thickness, constitution, ply orientations and stacking sequence. The method comprises a fully continuous approach to optimisation applicable for large-scale optimisation and suitable for optimisation of large aerospace composite structures.

Although the invention has been described above with reference to one or more preferred embodiments, it will be appreciated that various changes or modifications may be made without departing from the scope of the invention as defined in the appended claims.

The invention claimed is:

1. A method of designing a composite laminate, the laminate comprising a plurality of zones, each zone comprising a plurality of plies of composite material, each ply in each zone having a respective ply orientation angle, the method comprising the steps of:
   a. determining a global stacking sequence for the laminate, the global stacking sequence comprising a sequence of stacking sequence elements each stacking sequence element defining a respective global ply orientation angle, the percentages of the various ply orientations within the global stacking sequence defining a laminate constitution;
   b. determining a local laminate thickness for each zone; and
   c. determining a local stacking sequence for each zone by extracting a subsequence of stacking sequence elements from the global stacking sequence,
wherein said steps a, b and c are carried out together in an optimisation process comprising:
   (1) assigning multiple sub-ply selection variables to each stacking sequence element, wherein each sub-ply selection variable represents at least one of the density and sub-ply thickness for a respective candidate ply orientation angle;
   (2) determining optimal values for the sub-ply selection variables and the local laminate thicknesses; and
   (3) assigning a single one of the sub-ply selection variables to each stacking sequence element thereby forcing a discrete choice of global ply orientation angle for each stacking sequence element, each of said method steps is implemented on a computer.

2. The method of claim 1 further comprising determining multiple local ply orientation design variables for each zone, each local ply orientation design variable representing a local ply orientation correction for a respective global ply orientation angle as used in the global stacking sequence; and wherein the local ply orientation design variables, the global stacking sequence, the laminate constitution and the local laminate thicknesses are determined together in the optimisation process.

3. The method of claim 1 wherein the optimisation process is a gradient-based optimisation process which performs repeated structural analysis, sensitivity analysis and mathematical optimisation steps, and identifies a set of sub-ply selection variables and local laminate thicknesses which optimize an objective function whilst satisfying one or more constraint requirements, wherein each structural analysis step calculates current values for the objective function and one or more constraint functions based on a current set of sub-ply selection variables and local laminate thicknesses, each sensitivity analysis step determines partial derivatives of the output of the structural analysis, and each mathematical optimisation step solves an approximate optimisation problem to determine improved values for the sub-ply selection variables and local laminate thicknesses which optimise the objective function whilst ensuring that each constraint function complies with an associated constraint requirement.

4. The method of claim 3 wherein the objective function contains a penalty term which pushes the optimisation process towards selecting a single one of the sub-ply selection variables for each stacking sequence element.

5. The method of claim 3 wherein the structural analysis step further comprises calculating the laminate constitution and calculating stiffness properties of the composite laminate from the laminate constitution.

6. The method of claim 5 wherein the stiffness properties are calculated by interpolating stiffness properties found at discrete local laminate thickness values.

7. The method of claim 3 wherein the structural analysis comprises a first structural analysis which calculates internal loads within the laminate and a second structural analysis which calculates strength and/or buckling properties of the laminate; and wherein the sensitivity analysis comprises a first sensitivity analysis which determines partial derivatives of the output of the first structural analysis and a second sensitivity analysis which determines partial derivatives of the output of the second structural analysis and is combined with the first sensitivity analysis.

8. The method of claim 7 wherein the first and second sensitivity analyses are performed by parallel computing streams.

9. The method of claim 3 wherein the sensitivity analysis is based on a set of intermediate variables which are derived from the sub-ply selection variables and/or the local laminate thicknesses.

10. The method of claim 9 wherein the intermediate variables include the laminate constitution.

11. The method of claim 9 wherein the intermediate variables include laminate bending stiffness parameters.

12. The method of claim 1 wherein the subsequence of stacking sequence elements from the global stacking sequence is a contiguous subsequence of stacking sequence elements from the global stacking sequence.

13. A method of manufacturing a composite laminate, the method comprising designing the composite laminate by the method of claim 1; and manufacturing the composite laminate in accordance with the design.

14. A method of designing a composite laminate, the laminate comprising a plurality of zones, each zone comprising a plurality of plies of composite material, each ply in each zone having a respective ply orientation angle, the method comprising the steps of:
   a. determining a global stacking sequence for the laminate, the global stacking sequence comprising a sequence of stacking sequence elements each stacking sequence element defining a respective global ply orientation angle, the percentages of the various ply orientations within the global stacking sequence defining a laminate constitution;
   b. determining a local laminate thickness for each zone; and
   c. determining a local stacking sequence for each zone by extracting a subsequence of stacking sequence elements from the global stacking sequence,
wherein said steps a, b and c are carried out together in an optimisation process comprising:
   (1) assigning multiple sub-ply selection variables to each stacking sequence element, wherein each sub-ply selection variable represents at least one of the density and sub-ply thickness for a respective candidate ply orientation angle;
   (2) determining optimal values for the sub-ply selection variables and the local laminate thicknesses; and
   (3) assigning a single one of the sub-ply selection variables to each stacking sequence element thereby forcing a discrete choice of global ply orientation angle for each stacking sequence element, each of said method steps is implemented on a computer, wherein the optimisation process is a gradient-based optimisation process which performs repeated structural analysis, sensitivity analysis and mathematical optimisation steps, and identifies a set of sub-ply selection variables and local laminate thicknesses which optimize an objective function whilst satisfying one or more constraint requirements, wherein each structural analysis step calculates current values for the objective function and one or more constraint functions based on a current set of sub-ply selection variables and local laminate thicknesses, each sensitivity analysis step determines partial derivatives of the output of the structural analysis, and each mathematical optimisation step solves an approximate optimisation problem to determine improved values for the sub-ply selection variables and local laminate thicknesses which optimise the objective function whilst ensuring that each constraint function complies with an associated constraint requirement, wherein the objective function contains a penalty term which pushes the optimisation process towards selecting a single one of the sub-ply selection variables for each stacking sequence element.

15. A method of designing a composite laminate, the laminate comprising a plurality of zones, each zone comprising a plurality of plies of composite material, each ply in each zone having a respective ply orientation angle, the method comprising the steps of:
   a. determining a global stacking sequence for the laminate, the global stacking sequence comprising a sequence of stacking sequence elements each stacking sequence element defining a respective global ply orientation angle, the percentages of the various ply orientations within the global stacking sequence defining a laminate constitution;
   b. determining a local laminate thickness for each zone; and
   c. determining a local stacking sequence for each zone by extracting a subsequence of stacking sequence elements from the global stacking sequence,
wherein said steps a, b and c are carried out together in an optimisation process comprising:
   (1) assigning multiple sub-ply selection variables to each stacking sequence element, wherein each sub-ply selection variable represents at least one of the density and sub-ply thickness for a respective candidate ply orientation angle;
   (2) determining optimal values for the sub-ply selection variables and the local laminate thicknesses; and
   (3) assigning a single one of the sub-ply selection variables to each stacking sequence element thereby forcing a discrete choice of global ply orientation angle for each stacking sequence element, each of said method steps is implemented on a computer, wherein the optimisation process is a gradient-based optimisation process which performs repeated structural analysis, sensitivity analysis and mathematical optimisation steps, and identifies a set of sub-ply selection variables and local laminate thicknesses which optimize an objective function whilst satisfying one or more constraint requirements, wherein each structural analysis step calculates current values for the objective function and one or more constraint functions based on a current set of sub-ply selection variables and local laminate thicknesses, each sensitivity analysis step determines partial derivatives of the output of the structural analysis, and each mathematical optimisation step solves an approximate optimisation problem to determine improved values for the sub-ply selection variables and local laminate thicknesses which optimise the objective function whilst ensuring that each constraint function complies with an associated constraint requirement, wherein the structural analysis step further comprises calculating the laminate constitution and calculating stiffness properties of the composite laminate from the laminate constitution, wherein the stiffness properties are calculated by interpolating stiffness properties found at discrete local laminate thickness values.

* * * * *